United States Patent
Weksler et al.

(10) Patent No.: US 9,823,083 B2
(45) Date of Patent: Nov. 21, 2017

(54) FORECASTING ARRIVAL TIMES

(71) Applicant: LENOVO (Singapore) PTE, LTD., New Tech Park (SG)

(72) Inventors: Arnold S. Weksler, Raleigh, NC (US); John Carl Mese, Cary, NC (US); Nathan J. Peterson, Durham, NC (US); Russell Speight VanBlon, Raleigh, NC (US); Rod D. Waltermann, Rougemont, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 168 days.

(21) Appl. No.: 14/816,932

(22) Filed: Aug. 3, 2015

(65) Prior Publication Data
US 2017/0038220 A1   Feb. 9, 2017

(51) Int. Cl.
*G01C 21/00* (2006.01)
*G01C 21/34* (2006.01)

(52) U.S. Cl.
CPC .............................. *G01C 21/3438* (2013.01)

(58) Field of Classification Search
CPC .............................................. G01C 21/3438
See application file for complete search history.

(56) References Cited

U.S. PATENT DOCUMENTS

| 6,184,802 B1* | 2/2001 | Lamb ..................... G08G 1/123 340/988 |
| 2009/0165049 A1* | 6/2009 | Sekiguchi .............. H04H 60/51 725/39 |
| 2010/0211425 A1* | 8/2010 | Govindarajan ........ G01C 21/34 705/7.16 |
| 2011/0178701 A1* | 7/2011 | Gupta .................... G01C 21/20 701/465 |
| 2011/0231091 A1* | 9/2011 | Gourlay ........... G08G 1/096811 701/465 |
| 2014/0207373 A1* | 7/2014 | Lerenc ............... G01C 21/3438 701/465 |
| 2014/0207375 A1* | 7/2014 | Lerenc ................... H04W 4/02 701/527 |

* cited by examiner

*Primary Examiner* — Ian Jen
(74) *Attorney, Agent, or Firm* — Kunzler P.C.

(57) ABSTRACT

Apparatuses, method, systems, and program products are disclosed for forecasting arrival times. A method includes receiving, by a processor, travel data in response to requesting travel data from each of one or more users travelling to a location. The travel data includes data associated with one or more factors that affect an arrival time of each user at the location. A method includes calculating an estimated arrival time at the location for each user of the one or more users based on the travel data. A method includes presenting the estimated arrival time at the location for each user of the one or more users.

20 Claims, 6 Drawing Sheets

FORECASTING ARRIVAL TIMES

FIELD

The subject matter disclosed herein relates to coordinating events and more particularly relates to forecasting arrival times of users travelling to an event.

BACKGROUND

Description of the Related Art

It can be difficult to coordinate arrival times for guests travelling to an event. Guests may manually provide their arrival projections, but this can be cumbersome and error-prone. If guests do not provide their arrival projections, the event coordinator may need to manually contact the guests to request the information, which can be inconvenient and takes time. Moreover, guests may not be able to predict unforeseen delays, such as detours, traffic issues, or unscheduled stops. Thus, the event coordinator may not have an accurate prediction of when guests will arrive at the event.

BRIEF SUMMARY

An apparatus for forecasting arrival times is disclosed. A method and program product also perform the functions of the apparatus. In one embodiment, an apparatus includes a processor and memory that stores code executable by the processor. In one embodiment, the code includes code that receives travel data in response to requesting travel data from each of one or more users travelling to a location. In some embodiments, the travel data includes data associated with one or more factors that affect an arrival time of each user at the location.

In a further embodiment, the code includes code that calculates an estimated arrival time at the location for each user of the one or more users based on the travel data. In some embodiments, the code includes code that presents the estimated arrival time at the location for each user of the one or more users.

In one embodiment, the code includes code that receives new travel data in response to requesting travel data from each user of the one or more users at predetermined intervals and updates the estimated arrival times based on the new travel data. In various embodiments, the travel data is requested from each of the one or more users in response to each user accepting an invitation to meet at the location. In a further embodiment, the estimated arrival times for each user are presented in one or more of a mapping service, a navigation system, a mobile application, a website, and an email application.

In some embodiments, the code includes code that calculates an estimated arrival time to the location for each user as a function of different modes of transportation. In another embodiment, the one or more factors include a user's location, weather along a predicted travel path of the user, traffic along a predicted travel path of the user, construction along a predicted travel path of the user, a user's rate of travel, public transportation delays, one or more detours taken by a user, and user-provided information.

In one embodiment, the code includes code that incorporates one or more delays into the estimated time of arrival for a user based on one of a location of the user and a predicted travel path of the user. In some embodiments, the code includes code that determines a user is not travelling to the location in response to the user travelling in a different direction than a predicted travel path.

In a further embodiment, the code includes code that determines a percentage of users that will arrive at the location at a particular time based on the estimated arrival times. In one embodiment, the code includes code that determines the first user to arrive at the location based on the estimated arrival times. In another embodiment, the code includes code that determines an order of users arriving at the location based on the estimated arrival times.

A method, in one embodiment, includes receiving, by a processor, travel data in response to requesting travel data from each of one or more users travelling to a location. In one embodiment, the travel data includes data associated with one or more factors that affect an arrival time of each user at the location. In a further embodiment, the method includes calculating an estimated arrival time at the location for each user of the one or more users based on the travel data. In yet another embodiment, the method includes presenting the estimated arrival time at the location for each user of the one or more users.

In one embodiment, the method includes receiving new travel data in response to requesting travel data from each user of the one or more users at predetermined intervals and updates the estimated arrival times based on the new travel data. In a further embodiment, the travel data is requested from each of the one or more users in response to each user accepting an invitation to meet at the location. In certain embodiments, the estimated arrival times for each user are presented in one or more of a mapping service, a navigation system, a mobile application, a website, and an email application.

In some embodiment, the one or more factors include a user's location, weather along a predicted travel path of the user, traffic along a predicted travel path of the user, construction along a predicted travel path of the user, a user's rate of travel, public transportation delays, one or more detours taken by a user, and user-provided information. In a further embodiment, the method includes incorporating one or more delays into the estimated time of arrival for a user based on one of a location of the user and a predicted travel path of the user.

In one embodiment, the method includes determining a percentage of users that will arrive at the location at a particular time based on the estimated arrival times. In various embodiments, the method includes determining a user is not travelling to the location in response to the user travelling in a different direction than a predicted travel path.

In one embodiment, a program product includes a computer readable storage medium that stores code executable by a processor. In some embodiments, the executable code includes code to perform receiving travel data in response to requesting travel data from each of one or more users travelling to a location. In certain embodiments, the travel data includes data associated with one or more factors that affect an arrival time of each user at the location.

In various embodiments, the executable code includes code to perform calculating an estimated arrival time at the location for each user of the one or more users based on the travel data. In one embodiment, the executable code includes code to perform presenting the estimated arrival time at the location for each user of the one or more users.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
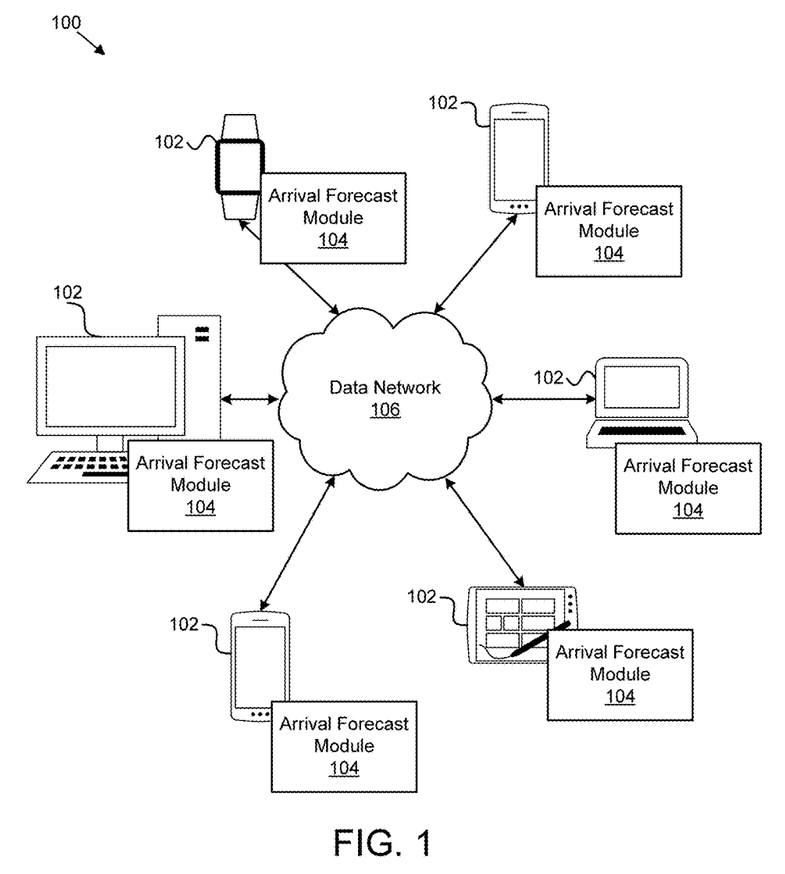
FIG. 1 is a schematic block diagram illustrating one embodiment of a system for forecasting arrival times.

FIG. 1 illustrates one embodiment of a system 100 for forecasting arrival times. In one embodiment, the system 100 includes information handling devices 102, arrival forecast modules 104, and data networks 106. In certain embodiments, even though a specific number information handling devices 102, arrival forecast modules 104, and data networks 106 are depicted in FIG. 1, one of skill in the art will recognize that any number of information handling devices 102, arrival forecast modules 104, and data networks 106 may be included in the system 100 for managing storage of digital content.

In one embodiment, the information handling devices 102 include desktop computers, laptop computers, personal digital assistants (PDAs), tablet computers, smart phones, smart televisions (e.g., televisions connected to the Internet), set-top boxes, game consoles, digital cameras, or the like. In some embodiments, the information handling devices 102 comprise wearable devices, such as smart watches, fitness bands, optical head-mounted displays, or the like.

In certain embodiments, the information handling devices 102 include servers, blade servers, virtual servers, cloud servers, servers of a data center, or the like. The servers may be configured as application servers, email servers, database servers, file servers, game servers, home servers, media servers, web servers, and/or the like. In certain embodiments, the servers are communicatively coupled to other information handling devices 102 via the data network 106 such that the information handling devices 102 may store and/or access data on the servers as it relates to the arrival forecast module 104. For example, servers may store calendar events, travel data, GPF data, traffic data, weather data, construction data, user profiles, or the like.

In one embodiment, the arrival forecast module 104 is configured to receive travel data in response to requesting travel data from one or more users travelling to a location. The travel data may include data associated with one or more factors that affect an arrival time of each user at the location. In a further embodiment, the arrival forecast module 104 is configured to calculate an estimated arrival time at the location for each user of the one or more users based on the travel data and present the estimated arrival time at the location for each user of the one or more users.

The data network 106, in one embodiment, comprises a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

Figure 2:
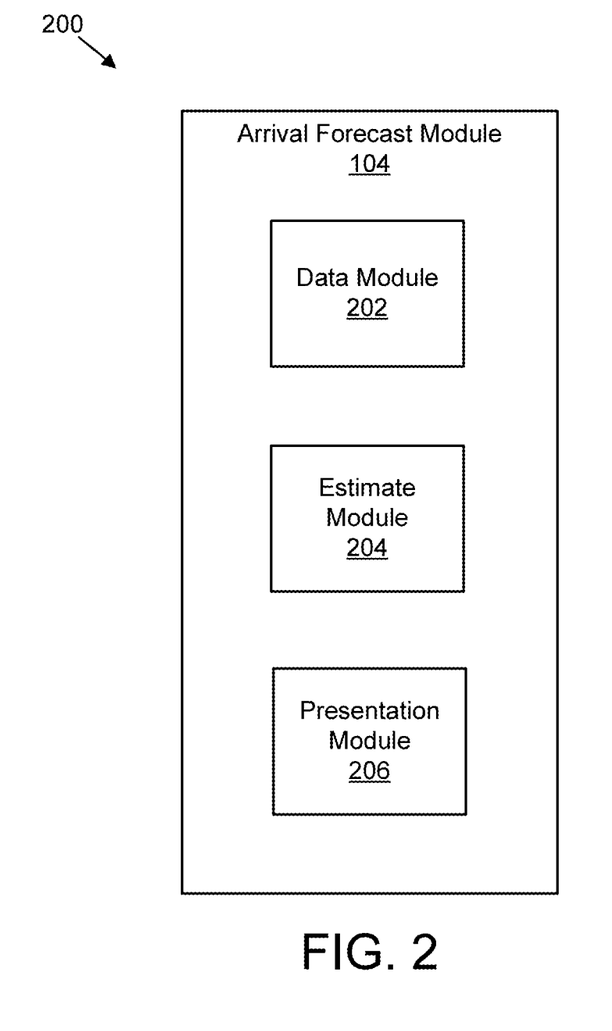
FIG. 2 is a schematic block diagram illustrating one embodiment of a module for forecasting arrival times.

FIG. 2 illustrates one embodiment of a module 200 for forecasting arrival times. In one embodiment, the module 200 includes an embodiment of an arrival forecast module 104. The arrival forecast module 104, in certain embodiments, includes one or more of a data module 202, an estimate module 204, and a presentation module 206, which are described in more detail below.

In one embodiment, the data module 202 is configured to receive travel data from one or more users travelling to a location. In one embodiment, the location includes a central location where each user is meeting. In another embodiment, the location includes a different location for each user, or a location that is not central for each user (e.g., three users may be meeting at location A while two other users may be meeting at location B). In certain embodiments, the data module 202 may request travel data from a user in response to the user accepting an invitation, for example, to attend an event, party, meeting, or other gathering at a location. In some embodiments, the event may be coordinated by an event coordinator who may be interested in determining when each person who accepted an invitation will arrive at the event, which may be helpful in making preparations for the event, such as food preparations, or the like. Thus, the travel data may be used, as described below, to estimate an arrival time of each user who accepted an invitation to the event.

In some embodiments, the data module 202 receives travel data from a user in response to requesting travel data from the user. In certain embodiments, the data module 202 may "pull" travel data from a smart phone associated with a user, instead of the user manually "pushing" travel data to the data module 202. For example, the data module 202 may request travel data from a user at predetermined intervals (e.g., every 5 minutes, 1 minute, 30 seconds, etc.), which may be used to update the estimated arrival time of the user at each interval. In one embodiment, the travel data is pulled from a user's smart phone, laptop, tablet computer, smart watch, car navigation system, fitness band, or the like. In other embodiments, the travel data may be pulled from a user's device and stored in a central server, such as a cloud server, and the data module 202 may pull the data from the central server.

In one embodiment, the data module 202 is granted access to "pull" the travel data for a predetermined period of time, for a particular event, or the like. For example, the data module 202 may be granted access to "pull" a user's travel data up until 15 minutes after the scheduled start time of the event. Thereafter, the data module's 202 access to the user's travel data may be revoked such that the data module 202 is not allowed to "pull" the user's travel data until the user accepts an invitation to a new event.

In some embodiments, travel data includes data associated with one or more factors that may affect an arrival time of each user at the location. The one or more factors may include the user's current location, the user's mode of transportation, weather conditions along a predicted travel path of the user, traffic conditions along a predicted travel path of the user, construction along a predicted travel path of the user, a user's rate of travel, public transportation delays (e.g., airline delays, bus delays, train delays, taxi delays, etc.), one or more detours taken be a user, user-provided information, or the like. For example, the table below illustrates travel data that the data module 202 may receive from each user:

TABLE 1

| User | Location | Mode of Transportation | Weather | Rate of Travel | Traffic Delay | Construction Delay |
|---|---|---|---|---|---|---|
| A | GPS Coord1 | Bike | Sunny | 15 MPH | N/A | N/A |
| B | GPS Coord2 | Walk | Rainy | 5 MPH | N/A | N/A |
| C | GPS Coord3 | Car | Sunny | 45 MPH | 5 Min | 5 min |

The estimate module 204, in one embodiment, is configured to calculate an estimated arrival time at the location for each user travelling to the location based on the received travel data. In one embodiment, the estimate module 204 may predict or forecast a user's expected travel path to the location, based on the user's current location and the site of the location. Based on the predicted path and the received travel data for the user, the estimate module 204 may factor in delays, such as traffic, construction, etc., along the predicted path to determine the user's estimated arrival time.

For example, the estimate module 204 may determine the best-case estimated time of arrival for a user that does not account for any delays in the user's travel. Using the best-case estimate as a baseline, the estimate module 204 may then incorporate time for expected or forecasted delays, such as traffic delays caused by road construction around the user's expected travel path, rush hour, accidents, the end of a sporting event, or the like, weather-related delays, delays associated with the user's mode of transportation (e.g., airport delays, train delays, etc.), or the like. For example, the estimate module 204 may determine that a traffic accident occurred a few miles ahead of the user's current location or that a sporting event is about to end, both of which may create greater than expected traffic and delay the user's estimated arrival time at the location. In another example, the estimate module 204 may determine whether a user's flight or train is delayed and incorporate the estimated delay into the user's estimated arrival time.

In certain embodiments, the estimate module 204 may estimate and incorporate arrival delays based on the user's current location. For example, the estimate module 204 may determine that a user is stopped at a gas station, post office, dry cleaner, grocery store, or the like and may incorporate an amount of delay time based on the user's location. For example, the estimate module 204 may add 10 minutes on to the user's estimate arrival time if the user stops at a gas station or 30 minutes if the user stops at a grocery store.

In one embodiment, if the estimate module 204 determines that the user is travelling in a different direction than the location or is located outside a threshold distance from the expected travel path, the estimate module 204 may determine that the user is not attending the event and will stop calculating the estimated arrival time for the user. If the estimate module 204 determines that the user returns to the expected travel path or starts travelling in the direction of the location, the estimate module 204 may calculate a new estimated arrival time for the user based on new travel data received by the data module 202 or the update module 302.

The presentation module 206, in one embodiment, is configured to present the estimate arrival times of each user travelling to the location. In one embodiment, the presentation module 206 presents a list of each user and their respective estimated arrival times. In another embodiment, the presentation module 206 sorts the list of users in ascending or descending order according to their estimated arrival times. In a further embodiment, the presentation module 206 displays a percentage of users, and which users, will arrive at a particular time, as determined by the result module 306 described below. For example, if a party is scheduled to start at 7:00 PM, the presentation module 206 may present a list showing that 50% of the guests are expected to arrive at 6:30 PM, 75% are expected to arrive at 6:45 PM, and 95% are expected to arrive at 7:00 PM. In this manner, the event coordinator can make preparations, such as food preparations, based on the estimated percentage of guests that are expected to arrive at a particular time.

Figure 4:
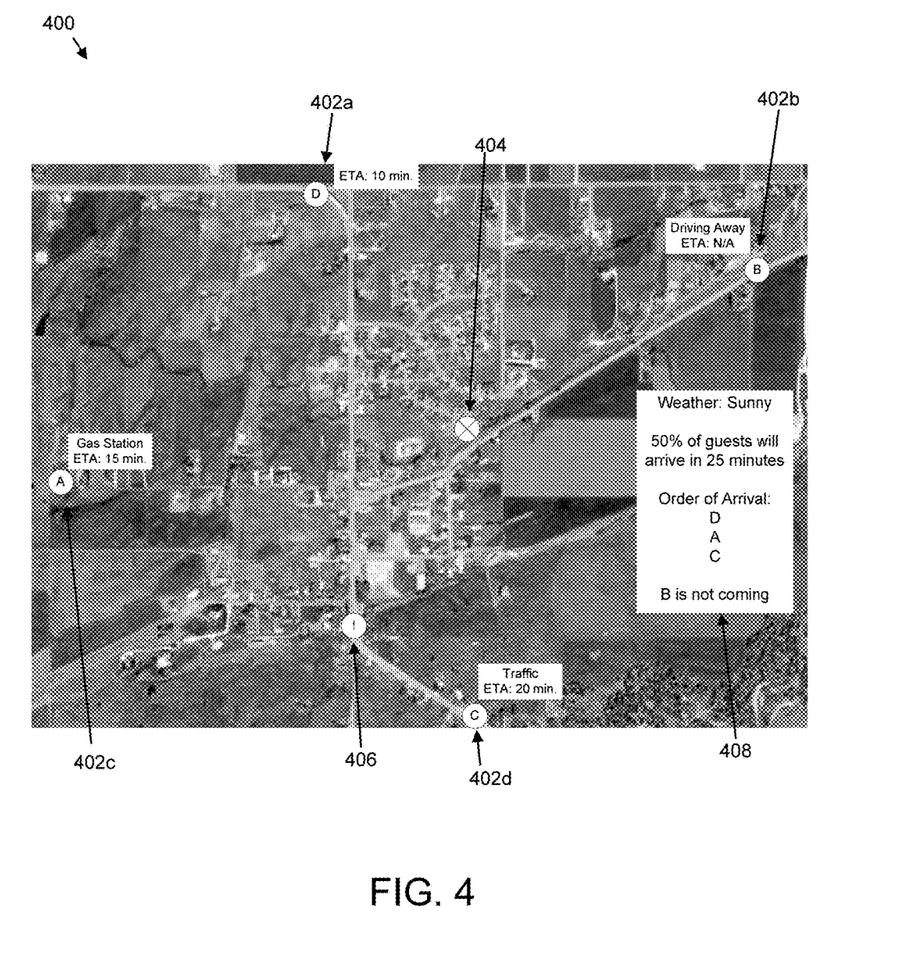
FIG. 4 is a schematic block diagram illustrating one embodiment of forecasting arrival times.

In one embodiment, the presentation module 206 presents the estimated arrival times of each user on a mapping service, such as Google Maps®, including the users' current locations and their expected travel paths, as shown in FIG. 4. In some embodiments, the presentation module 206 displays the users' estimated arrival times in a website, a mobile application, an email application, such as an email client or a web-based email application, a scheduling application, or the like. For example, the event coordinator may schedule an event and invite attendees to an event using a calendar feature in an email client, such as Microsoft Outlook®, or a web-based email application, such as Gmail®. The presentation module 206 may then present the estimated arrival time of each user who accepted the invitation from the event coordinator in the email client. In some embodiments, the calculation and presentation of the estimated arrival times may be an add-on, fee-based, subscription-based, or the like feature of a website, software program, application, or the like.

Figure 3:
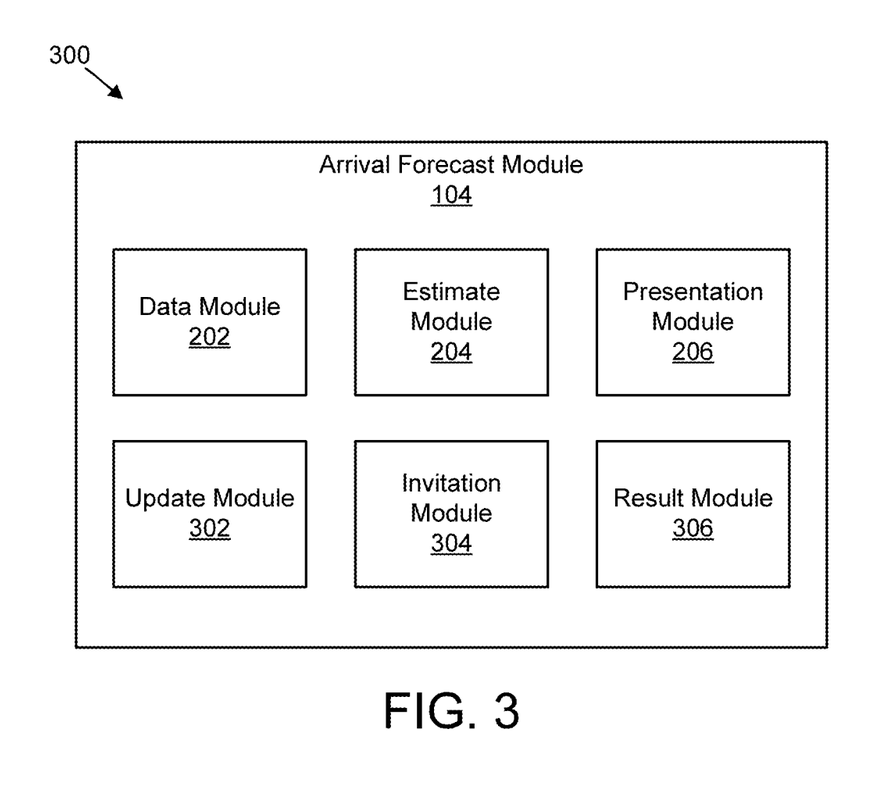
FIG. 3 is a schematic block diagram illustrating one embodiment of another module for forecasting arrival times.

FIG. 3 illustrates one embodiment of another module 300 for forecasting arrival times. In one embodiment, the module 300 includes an embodiment of an arrival forecast module 104. The arrival forecast module 104 may include one or more of a data module 202, an estimate module 204, and a presentation module 206, which may be substantially similar to the data module 202, the estimate module 204, and the presentation module 206 described above with reference to FIG. 2. In one embodiment, the arrival module 104 also includes one or more of an update module 302, an invitation module 304, and a result module 306, which are described in more detail below.

In one embodiment, the update module 302 is configured to receive new travel data in response to requesting travel data from each user at predetermined intervals. For example, the update module 302 may receive or "pull" new travel data from each user every 5 minutes, 1 minute, 30 seconds, according to a user-defined interval, or the like. In another embodiment, the update module 302 may receive new travel data from each user in response to user input. For example, an event coordinator may manually pull data from each user, or from selected users, to determine the estimated arrival times of the user(s). In one embodiment, in response to the update module 302 receiving new travel data, the update module 302 may use the estimate module 204 to calculate updated estimated arrival times for the users and the presentation module 206 to present the updated estimated arrival times.

In one embodiment, the invitation module 304 is configured to send an invitation to an event at the location to one or more users as determined by an event coordinator, for example. The invitation may include the type of event, a time of the event, the location of the event, details of the event, or the like. The event may be located at a central location or may be spread across several locations such that the invited users either gather at the central location or at various locations. As described above, the data module 202 may not "pull" travel data from one or more users unless the users opt-in to having their travel data sent to the data module 202, which may occur by accepting an invitation to an event at the location. The invitation module 304 may send an invitation to one or more users selected by an event coordinator in the form of an email, text message, calendar event, or the like, and the invitees may accept or decline the invitation by email, text message, accepting/declining a calendar event, or the like.

In one embodiment, the result module 306 is configured to determine one or more results based on the expected arrival times of each user. For example, the result module 306 may determine which user is expected to arrive first. In another example, the result module 306 may determine the order of user arrivals based on the respective estimated arrival times of each user. In a further example, the result module 306 may determine which user is expected to arrive last. In yet another example, the result module 306 may determine a percentage of users that are expected to arrive at a particular time. The result module 306 may determine that 50% of the users are expected to arrive 20 minutes before the scheduled event time, 75% of the users are expected to arrive 10 minutes before the scheduled event time, and so on. The presentation module 206 may display one or more results determined by the result module 306.

FIG. 4 illustrates one embodiment 400 of forecasting arrival times. In the depicted embodiment 400, one or more users 402*a-d* have been invited to an event at a location 404. In response to the users 402*a-d* accepting invitations to attend the event at the location 404, the data module 202 requests to "pull" travel data from each user 402*a-d*. For example, the data module 202 may receive travel data from smart devices associated with each user 402*a-d*, from third-party data sources, such as traffic monitoring services, mapping/location services, weather services, or the like.

Based on the received travel data, the estimate module 204 calculates an estimated arrival time for each user 402*a-d*. The estimate module 204 may determine a baseline estimated arrival time for each user 402*a-d*, without accounting for any possible delays, and then adjust the baseline estimated arrival time according to factors that may delay or otherwise affect a user's 402*a-d* estimated arrival time. For example, the estimate module 204 may determine that the baseline estimated arrival time of user A 402*c* is 5 minutes, but the estimate module 204 may adjust the baseline estimated arrival time by adding 10 minutes because user A 402*c* has made a stop at a gas station. Similarly, the estimate module 204 may adjust user C's 402*d* estimated arrival time due to a possible traffic delay 406.

Furthermore, the estimate module 204 may determine that user B 402*b* is travelling away from the location 404 based on the received travel data for user B 402*b*. Accordingly, the estimate module 204 may not calculate an estimated arrival time for user B 402*b*. The result module 306 may determine one or more arrival results based on the estimated arrival times. For example, the result module 306 may determine that 50% of the users 402*a-d* will arrive in 25 minutes. The result module 306 may also determine which user 402*a-d* will arrive first and/or an expected arrival order for the users 402*a-d*. The presentation module 206 may present 408 the information determined by the estimate module 204 and the results module 306 in a webpage, an application, or a mapping service, as depicted in FIG. 4. Moreover, the update module 302 may receive updated travel data at predetermined intervals, which the estimate module 204 and the result module 306 can use to update the estimated arrival times and the results based on the estimated arrival times.

Figure 5:
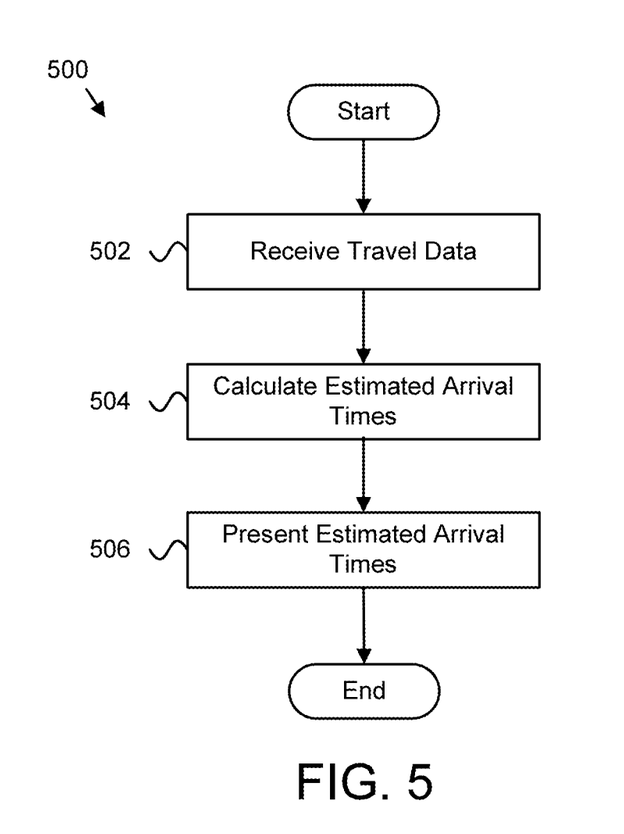
FIG. 5 is a schematic flow chart diagram illustrating one embodiment of a method for forecasting arrival times.

FIG. 5 illustrates one embodiment of a method 500 for forecasting arrival times. In one embodiment, the method 500 begins and receives 502 travel data in response to requesting travel data from one or more users travelling to a location. In some embodiments, the travel data includes data associated with one or more factors that affect an arrival time of each user at the location. In one embodiment, the data module 202 receives 502 the travel data from a smart device associated with a user, a third-party data source (e.g., a weather database, a traffic database, etc.), or the like.

In a further embodiment, the method 500 calculates 504 an estimated arrival time at the location for each user for the one or more users based on the received travel data. In some embodiments, the estimate module 204 calculates 504 the estimated arrival times for each user. The method 500, in one embodiment, presents 506 the estimated arrival times at the location for each user. In certain embodiments, the presentation module 206 presents 506 the estimated arrival times, and the method 500 ends.

Figure 6:
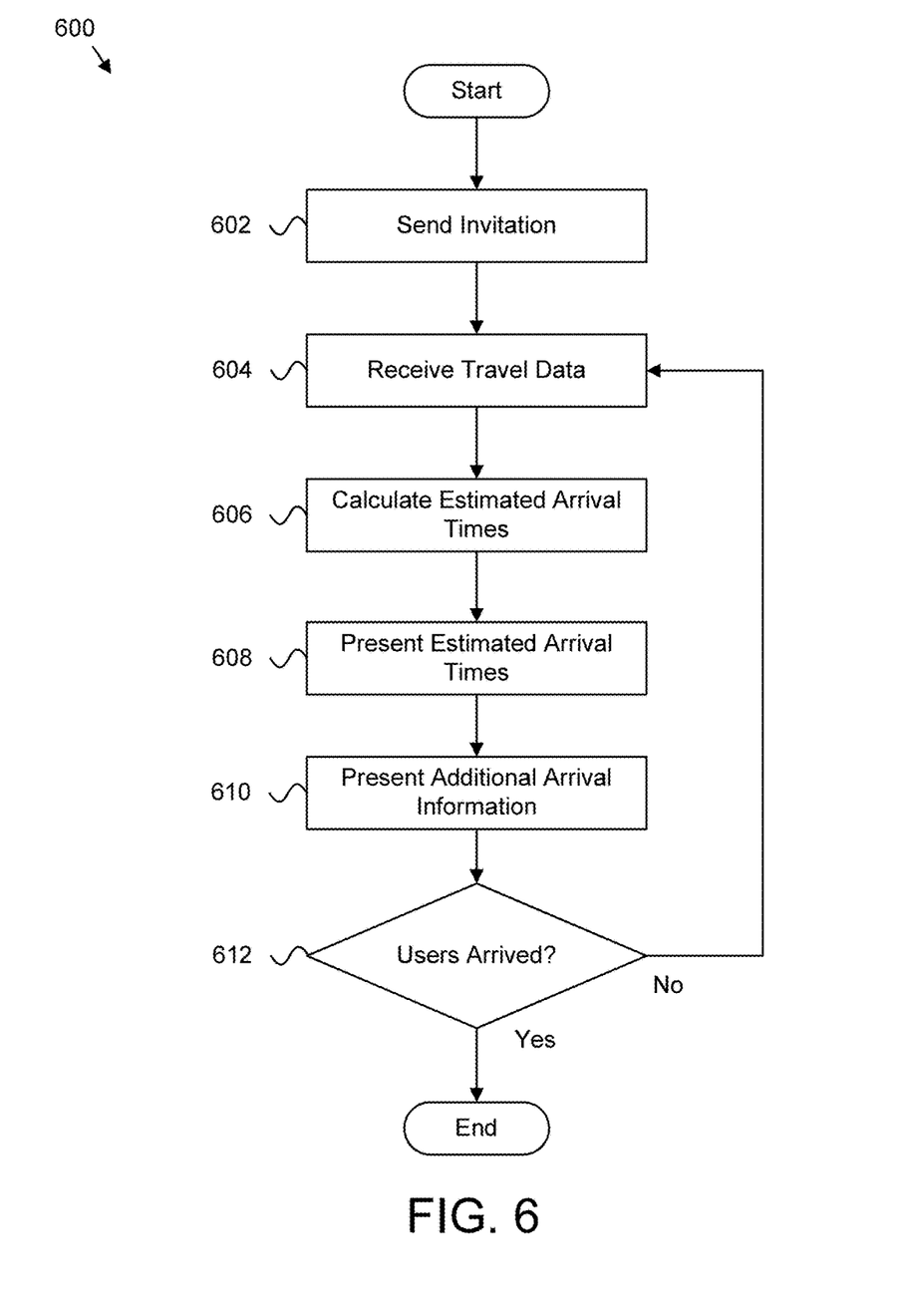
FIG. 6 is a schematic flow chart diagram illustrating one embodiment of another method for forecasting arrival times.

FIG. 6 illustrates one embodiment of another method 600 for forecasting arrival times. In one embodiment, the method 600 begins and sends 602 an invitation to one or more users, e.g., one or more guests for a party. In one embodiment, the invitation module 304 sends 602 an invitation to one or more users. An invitation, in some embodiments, may be sent using a text message, email message, application notification, or the like. In response to one or more users accepting the invitation to the event, the method 600 receives 604 travel data associated with the one or more users by "pulling" the travel down from one or more data sources. In one embodiment, the data module 202 receives 204 the travel data associated with each user.

In a further embodiment, the method 600 calculates 606 estimated arrival times at a location for each user based on the received travel data. In some embodiments, the estimate module 204 calculates 606 the estimated arrival times for each user. In various embodiments, the method 600 presents 608 the estimated arrival times for each user. In some embodiments, the method 600 presents 608 the estimated arrival times using a mapping/location service, an email application, a website, a mobile application, or the like. In certain embodiments, the presentation module 206 presents 608 the estimated arrival times.

In a further embodiment, the method 600 presents 610 additional arrival information, such as one or more results determined by the result module 306. For example, the method 600 may present 610 a list of users sorted by their estimated arrival times, a percentage of users who will arrive at a particular time, the first user that is expected to arrive, etc. The method 600 may determine 612 if all the users have arrived at the location. In certain embodiments, the update module 302 determines 612 whether or not all the users have arrived. If the method determines 612 that there are users who have not yet arrived, the method 600 receives 604 updated travel data that can be used to calculate 606 new estimated arrival times and present 608, 610 the new estimated arrival times and additional arrival information, and the method 600 ends. If the method 600 determines 612 that all the users have arrived, the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
      receive travel data over a network from a plurality of different sources and a plurality of devices associated with different users in response to requesting travel data from each of the different users travelling to a location, the travel data comprising data associated with one or more factors that affect an arrival time of each user at the location;
      calculate an estimated arrival time at the location for each user of the one or more users based on the travel data;
      determine a percentage of users that will arrive at the location at different periods of time before and after a target arrival time based on the estimated arrival times; and
      present the estimated arrival time at the location for each user of the one or more users and the percentage of users that will arrive at different periods of time before and after the target arrival time.

2. The apparatus of claim 1, further comprising code executable by the processor to receive new travel data in response to requesting travel data from each user of the one or more users at predetermined intervals and updates the estimated arrival times based on the new travel data.

3. The apparatus of claim 1, wherein the travel data is requested from each of the one or more users in response to each user accepting an invitation to meet at the location.

4. The apparatus of claim 1, wherein the estimated arrival times for each user are presented in one or more of:
   a mapping service;
   a navigation system;
   a mobile application;
   a website; and
   an email application.

5. The apparatus of claim 1, further comprising code executable by the processor to calculate an estimated arrival time to the location for each user as a function of different modes of transportation.

6. The apparatus of claim 1, wherein the one or more factors comprise:
   a user's location;
   weather along a predicted travel path of the user;
   traffic along the predicted travel path of the user;
   construction along the predicted travel path of the user;
   a user's rate of travel;
   public transportation delays;
   one or more detours taken by a user; and
   user-provided information.

7. The apparatus of claim 1, further comprising code executable by the processor to:
   determines current locations for the one or more users based on the travel data;
   determines that one or more users are stopped at their current locations;
   estimates a delay time associated with an activity related to the current locations where one or more users are stopped; and
   further calculates the estimated arrival time at the location for each user based at least in part on the estimated delay time for the one or more users that are stopped at their current locations.

8. The apparatus of claim 1, further comprising code executable by the processor to determine a user is not travelling to the location in response to the user travelling in a different direction than a predicted travel path.

9. The apparatus of claim 1, further comprising code executable by the processor to determine the first user to arrive at the location based on the estimated arrival times.

10. The apparatus of claim 1, further comprising code executable by the processor to determine an order of users arriving at the location based on the estimated arrival times.

11. A method comprising:
receiving, by a processor, travel data over a network from a plurality of different sources and a plurality of devices associated with different users in response to requesting travel data from each of the different users travelling to a location, the travel data comprising data associated with one or more factors that affect an arrival time of each user at the location;
calculating an estimated arrival time at the location for each user of the one or more users based on the travel data;
determining a percentage of users that will arrive at the location at different periods of time before and after a target arrival time based on the estimated arrival times; and
presenting the estimated arrival time at the location for each user of the one or more users and the percentage of users that will arrive at different periods of time before and after the target arrival time.

12. The method of claim 11, further comprising receiving new travel data in response to requesting travel data from each user of the one or more users at predetermined intervals and updates the estimated arrival times based on the new travel data.

13. The method of claim 11, wherein the travel data is requested from each of the one or more users in response to each user accepting an invitation to meet at the location.

14. The method of claim 11, wherein the estimated arrival times for each user are presented in one or more of:
a mapping service;
a navigation system;
a mobile application;
a website; and
an email application.

15. The method of claim 11, wherein the one or more factors comprise:
a user's location;
weather along a predicted travel path of the user;
traffic along the predicted travel path of the user;
construction along the predicted travel path of the user;
a user's rate of travel;
public transportation delays;
one or more detours taken by a user; and
user-provided information.

16. The method of claim 11, further comprising:
determining current locations for the one or more users based on the travel data;
determining that one or more users are stopped at their current locations;
estimating a delay time associated with an activity related to the current locations where one or more users are stopped; and
further calculating the estimated arrival time at the location for each user based at least in part on the estimated delay time for the one or more users that are stopped at their current locations.

17. The method of claim 11, further comprising determining a user is not travelling to the location in response to the user travelling in a different direction than a predicted travel path.

18. A program product comprising a non-transitory computer readable storage medium that stores code executable by a processor, the executable code comprising code to perform:
receiving travel data over a network from a plurality of different sources and a plurality of devices associated with different users in response to requesting travel data from each of the different users travelling to a location, the travel data comprising data associated with one or more factors that affect an arrival time of each user at the location;
determining a percentage of users that will arrive at the location at different periods of time before and after a target arrival time based on the estimated arrival times; and
presenting the estimated arrival time at the location for each user of the one or more users and the percentage of users that will arrive at different periods of time before and after the target arrival time.

19. The apparatus of claim 1, further comprising code that determines, based on the travel data, that a user of the one or more users is travelling away from the location such that the estimated arrival time at the location for each user of the one or more users, except for the user that is travelling away from the location, is calculated based on the travel data.

20. The method of claim 11, further comprising determining, based on the travel data, that a user of the one or more users is travelling away from the location such that the estimated arrival time at the location for each user of the one or more users, except for the user that is travelling away from the location, is calculated based on the travel data.

* * * * *